US012600807B2

(12) United States Patent
Wang et al.

(10) Patent No.: US 12,600,807 B2
(45) Date of Patent: Apr. 14, 2026

(54) POLYPROPYLENE FILM WITH IMPROVED SLIP PERFORMANCE

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Markku Vahteri, Porvoo (FI); Stefan Ortner, Linz (FI)

(73) Assignee: BOREALIS AG, Vienna (AT)

( * ) Notice: Subject to any disclaimer, the term of this patent is extended or adjusted under 35 U.S.C. 154(b) by 1034 days.

(21) Appl. No.: 17/627,207

(22) PCT Filed: Jul. 15, 2020

(86) PCT No.: PCT/EP2020/069925
§ 371 (c)(1),
(2) Date: Jan. 14, 2022

(87) PCT Pub. No.: WO2021/013643
PCT Pub. Date: Jan. 28, 2021

(65) Prior Publication Data
US 2022/0259339 A1      Aug. 18, 2022

(30) Foreign Application Priority Data

Jul. 19, 2019   (EP) ..................................... 19187210

(51) Int. Cl.
| | |
|---|---|
| *C08L 23/12* | (2006.01) |
| *B29C 48/00* | (2019.01) |
| *B29C 48/08* | (2019.01) |
| *B29C 48/10* | (2019.01) |
| *B29C 48/40* | (2019.01) |
| *C08F 2/00* | (2006.01) |
| *C08F 4/659* | (2006.01) |
| *C08F 4/6592* | (2006.01) |
| *C08F 110/06* | (2006.01) |
| *C08J 5/18* | (2006.01) |
| *C08K 3/36* | (2006.01) |
| *C08K 5/098* | (2006.01) |
| *C08K 5/20* | (2006.01) |

(52) U.S. Cl.
CPC .......... *C08F 110/06* (2013.01); *B29C 48/022* (2019.02); *B29C 48/08* (2019.02); *B29C 48/10* (2019.02); *B29C 48/40* (2019.02); *C08F 2/001* (2013.01); *C08F 4/65912* (2013.01); *C08F 4/65927* (2013.01); *C08J 5/18* (2013.01); *C08K 3/36* (2013.01); *C08K 5/098* (2013.01); *C08K 5/20* (2013.01); *C08L 23/12* (2013.01); *C08L 2203/16* (2013.01)

(58) Field of Classification Search
CPC .... C08L 23/12; C08L 2203/16; C08F 110/06; C08F 2500/34; C08K 3/36; C08K 5/20
See application file for complete search history.

(56) References Cited

U.S. PATENT DOCUMENTS

| | | | | | |
|---|---|---|---|---|---|
| 5,077,129 | A | * 12/1991 | Schinkel | ................. | B32B 27/08 |
| | | | | | 525/227 |
| 7,615,602 | B2 | * 11/2009 | Wolfschwenger | ...... | C08F 10/00 |
| | | | | | 526/348.1 |
| 8,933,256 | B2 | * 1/2015 | Castro | ................. | C08F 4/65912 |
| | | | | | 502/103 |
| 8,987,400 | B2 | * 3/2015 | Gloger | .................... | C08F 10/00 |
| | | | | | 526/348 |
| 9,595,388 | B2 | * 3/2017 | Gloger | .................. | C08K 5/053 |
| 9,701,801 | B2 | * 7/2017 | Leland | ................. | B29C 48/914 |
| 2009/0148716 | A1 | * 6/2009 | Stadlbauer | ............. | H01B 3/441 |
| | | | | | 264/299 |
| 2016/0222189 | A1 | * 8/2016 | Jacobs | ...................... | H01G 2/00 |

FOREIGN PATENT DOCUMENTS

| | | |
|---|---|---|
| EA | 031440 B1 | 1/2019 |
| EA | 031527 B1 | 1/2019 |
| EP | 0887379 B1 | 12/1998 |
| EP | 1883080 A1 | 1/2008 |
| EP | 1747239 B1 | 6/2008 |
| KR | 20010045571 A | 6/2001 |
| RU | 2378169 C9 | 12/2010 |
| RU | 2526259 C2 | 8/2014 |
| WO | 92/12182 A1 | 7/1992 |
| WO | 199414856 A1 | 7/1994 |
| WO | 199512622 A1 | 5/1995 |
| WO | 99/24478 A1 | 5/1999 |
| WO | 99/24479 A1 | 5/1999 |
| WO | 00/68315 A1 | 11/2000 |
| WO | 2002/002576 A1 | 1/2002 |
| WO | 2003/051934 | 6/2003 |

(Continued)

OTHER PUBLICATIONS

Applicant: Borealis AG; "Polypropylene Film with Improved Slip Performance"; PCT International Application No. PCT/EP2020/069925 Filed Jul. 15, 2020; PCT International Search Report and Written Opinion; Authorized Officer: Sandra Schlembach; Oct. 9, 2020; 16 pgs.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28, 1128-1137.
Cheng, et al., "13C NMR Analysis of Ethylene-Propylene Rubbers", Macromolecules 17, 1984, 1950-1955.
Resconi, Luigi, et al., "Selectivity in Propane Polymerization With Metallocene Catalysts", Chem. Rev. 2000, 100, 1253-1345.
Singh, Gurmeet, et al., "Triad Sequence Determination of Ethylene-Propylene Copolymers—Application of Quantitative 13C NMR", Polymer Testing 28 (2009) 475-479.

(Continued)

*Primary Examiner* — Rip A Lee
(74) *Attorney, Agent, or Firm* — Tarolli, Sundheim, Covell & Tummino LLP

(57) ABSTRACT

The invention is related to film comprising a polypropylene composition showing improved coefficiency of friction as well as optical properties.

11 Claims, No Drawings

(56) References Cited

FOREIGN PATENT DOCUMENTS

| WO | 2003/0051934 | A3 | 6/2003 |
| WO | 2004/000899 | A1 | 12/2003 |
| WO | 2006/097497 | A1 | 9/2006 |
| WO | 2006/0097497 | A1 | 9/2006 |
| WO | 2007/116034 | A1 | 10/2007 |
| WO | 2007/0116034 | A1 | 10/2007 |
| WO | 2010052260 | A1 | 5/2010 |
| WO | 2010052263 | A1 | 5/2010 |
| WO | 2010052264 | A1 | 5/2010 |
| WO | 2011/0076780 | A1 | 6/2011 |
| WO | 2011/076780 | A1 | 6/2011 |
| WO | 2011/0135004 | A1 | 11/2011 |
| WO | 2011135004 | | 11/2011 |
| WO | 2012001052 | | 1/2012 |
| WO | 2012/0084961 | A1 | 6/2012 |
| WO | 2012084961 | A1 | 6/2012 |
| WO | 2012093098 | A1 | 7/2012 |
| WO | 2015158790 | A2 | 10/2015 |
| WO | 2017178046 | A1 | 10/2017 |
| WO | 2018122134 | A1 | 7/2018 |
| WO | 2019179959 | A1 | 9/2019 |

OTHER PUBLICATIONS

Wang, Wen-Jun, et al., "Structural Analysis of Ethylene/Propylene Copolymers Synthesized With a Constrained Geometry Catalyst", Macromolecules 2000, 33, 1157-1162.

Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.

Dr. Hans Zweifel; Plastics Additives Handbook 5th Edition; Hanser Gardner Publications, Inc.; ISBN-10 : 156990295X; ISBN-13 : 978-1569902950; Jan. 1, 2001; 7 pgs.

Edward P. Moore, Jr.; "Polypropylene Handbook"; Polymerization, Characterization, Properties, Processing, Applications; Hanser/Gardner Publications, Inc.; (1996) 4 pgs.

Applicant: Borealis AG, AT; "Polypropylene Film with Improved Slip Performance"; Russian Application No. 2022103686/04(007863); Russian Patent Search Report; Authorized Officer: T.Ye. Tkachenko; Sep. 19, 2022; 4 pgs.

Applicant: Borealis AG, AT; Russian Application No. 2022103686/04(007863) Filed Jul. 15, 2020; Russian Office Action; Sep. 19, 2022; 18 pgs.

* cited by examiner

POLYPROPYLENE FILM WITH IMPROVED SLIP PERFORMANCE

The invention relates to a film comprising a polypropylene composition having a small dynamic coefficient of friction (CoF). The invention further relates to a process for producing said film.

Polypropylene is widely used in the packaging area, including soft packaging. Cast film made of polypropylene has the disadvantage of very slow slip agent migration compared to e.g. polyethylene. Especially cast films made of visbroken polypropylenes with a thickness of below 50 μm after production do not exhibit a sufficiently small CoF, which is required for good winding quality and also for the following conversion steps. For good winding quality and other confectioning steps, a small CoF is technically necessary and therefore a market requirement.

In order to fulfill this requirement it is state of the art to add one or more slip agents (in combination with one or more anti-blocking agents) to the polypropylene cast film grades. The slip agent migrates to the surface of the film, thus creating a slippery film which lowers the CoF dramatically. Since the migration to the surface of the slip agent in polypropylene is very slow, an excessive amount of slip agent is added in order to overcome this problem and to obtain the required CoF immediately after film production for good winding quality. If less slip agent is added, the CoF immediately after film production is too high and the film has to be stored for a long period (ca. 14 days) in order to achieve a sufficiently small CoF.

The disadvantages of this solution are high cost due to excessive amount of slip agent.

deterioration of optical film properties after a longer period of time because too much slip agent migrates to the film surface.

deposits of slip agent at the cast film production line when films having a thickness of about 70 μm are produced.

Another known approach is producing polypropylene with specific catalyst technology to achieve lower CoF in the presence of same amount, or even reduced amount of slip agent.

EP 1747239 discloses a process for producing a polypropylene film having small dynamic coefficient of friction, where a specific catalyst composition comprising a catalyst component in the form of particles having a defined size range is used for the polymerization of propylene.

KR 2001045571 discloses a process for preparing a film having good slip properties. This process comprises the steps of a) dispersing magnesium ethoxide as raw material of a magnesium-based carrier in a mixed solvent of organic alcohol, a hydrocarbon solvent and an organic phosphorous compound, b) adding anhydrous phthalic acid and c) dropping a titanium tetrachloride solution into the magnesium compound solution and d) collecting a solid component by filtering and adding titanium tetrachloride to the solid component.

U.S. Pat. No. 9,701,801 also discloses a process comprising (1) combining a metallocene catalyzed polypropylene with a nucleator and a slip agent to form a composition, wherein the amount of nucleator combined with the metallocene catalyzed polypropylene is adjusted to achieve a coefficient of friction (CoF) of less than 0.5; and (2) forming a cast film from the composition, wherein the cast film has a coefficient of friction at least 90% less than an otherwise identical cast film in which the nucleator is not present, wherein the coefficient of friction is measured in accordance with ASTM D1894.

However, besides of the coefficient of friction (CoF), also good optical properties, especially low haze and high clarity of the cast film, are usually required in the soft packaging area. Therefore, it is the object of the present invention to provide a cast or blown polypropylene film having a small dynamic coefficient of friction and good optical properties, especially low haze and high clarity, at the same time.

The above problem has surprisingly been solved by providing a film prepared with a polypropylene homopolymer with a low xylene cold soluble fraction (XCS) polymerized in the presence of a special metallocene catalyst.

Accordingly the present invention is directed to a film comprising a polypropylene composition comprising (a) 95.0-99.9 wt % of a propylene homopolymer (HPP) polymerized in the presence of a metallocene catalyst, wherein the propylene homopolymer (HPP) has a melting temperature (Tm) measured by differential scanning calorimetry (DSC) in the range from 152 to 162° C., a xylene cold soluble fraction (XCS) determined at 23° C. according to ISO 16152 of equal or below 1.5 wt % and has a content of 2,1 erythro regiodefects as determined from $^{11}$C-NMR spectroscopy in the range from 0.01 to 1.00 mol %, (b) 0.1-0.4 wt % of one or more slip agents, and (c) 0.0-0.5 wt % of one or more anti-blocking agents.

With the invention it is surprisingly possible to use the same amount of slip agent to achieve the reduced CoF after 7 days after production due to accelerated slip agent migration. Furthermore the better optical properties of the film, like lower haze value is observed.

The film is preferably a non-oriented cast or blown film, more preferably a non-oriented cast film.

In a further aspect, the present invention is directed to the process for preparing a film, comprising the steps of:

i) polymerizing the propylene homopolymer (HPP) according to the present invention in a multistage process, wherein a loop reactor is followed by a gas phase reactor, in the presence of a metallocene catalyst system, and ii) forming the propylene homopolymer (HPP) obtained in step (i) into a film together with 0.1-0.4 wt % of one or more slip agents, and 0.0-0.5 wt % of one or more anti-blocking agents by using a film blowing or casting process.

DETAILED DESCRIPTION OF THE INVENTION

In the following the film comprising polypropylene composition as well as the production process are defined in more detail.

Propylene Homopolymer (HPP)

According to the present invention, the polypropylene composition comprises 95.0-99.9 wt %, preferably 96.0-99.9 wt %, more preferably 96.5 to 99.5 wt % of a propylene homopolymer (HPP). The term "propylene homopolymer (HPP)" used in the present invention relates to a polypropylene that consists substantially, i.e. of more than 98.0 wt.-% of, preferably of more than 99.0 wt.-%, even more preferably of more than 99.5 wt.-%, still more preferably of at least 99.8 wt.-%, of propylene units. In a preferred embodiment, only propylene units in the propylene homopolymer (HPP) are detectable.

It is essential that the propylene homopolymer (HPP) has been polymerized in the presence of a metallocene catalyst.

It is further required that the propylene homopolymer (HPP) has a relatively high melting temperature Tm. More precisely, it is essential that the propylene homopolymer (HPP) has a melting temperature Tm measured by differential scanning calorimetry (DSC) according to ISO 11357 in the range from 152 to 162° C. For example, the polypropylene homopolymer (HPP) has a melting temperature Tm measured by differential scanning calorimetry (DSC) according to ISO 11357 in the range from 152 to 158° C., preferably in the range from 152 to 156° C.

It is also important that the propylene homopolymer (HPP) has a xylene cold soluble (XCS) content of equal or below 1.5 wt %, based on the total weight of the propylene homopolymer (HPP). For example, the propylene homopolymer (HPP) has a xylene cold soluble (XCS) content in the range from 0.1 to 1.5 wt %, preferably in the range from 0.3 to 1.2 wt %, more preferably in the range from 0.3 to 1.0 wt %, based on the total weight of the propylene homopolymer (HPP).

It is preferred that the polypropylene homopolymer (HPP) has a melt flow rate MFR2 (230° C., 2.16 kg) measured according to ISO 1133 in the range from 4.0 to 20.0 g/10 min, preferably in the range from 5.0 to 18.0 g/10 min, more preferably in the range from 5.5 to 16.0 g/10 min.

The relatively high melting temperature Tm indicates that the propylene homopolymer (HPP) has a rather low content of regiodefects. Thus, the propylene homopolymer (HPP) has a content of 2,1 erythro regiodefects as determined from $^{13}$C-NMR spectroscopy in the range from 0.01 to 1.00 mol.-%. More preferably, the propylene homopolymer (HPP) has 2,1 erythro regiodefects in the range from 0.20 to 0.80 mol.-% and most preferably in the range from 0.30 to 0.80 mol.-%, determined by $^{13}$C-NMR spectroscopy.

Additionally or alternatively, the propylene homopolymer (HPP) has an isotactic triad fraction (mm) determined from $^{13}$C-NMR spectroscopy of at least 97.5%. For example, the propylene homopolymer (HPP) has an isotactic triad fraction (mm) determined from $^{13}$C-NMR spectroscopy of at least 98.5%, more preferably of at least 99.0%, like in the range from 99.0 to 99.9%.

It is further preferred that the propylene homopolymer (HPP) has a weight average molecular weight (Mw) in the range from 80 to 500 kg/mol, preferably in the range from 100 to 400 kg/mol, more preferably in the range from 120 to 350 k/mol, and/or a number average molecular weight (Mn) of 20 to 200 kg/mol, more preferably 50 to 150 kg/mol, determined by GPC according to ISO 16014.

It is preferred that the propylene homopolymer (HPP) has a molecular weight distribution (MWD) measured according to ISO 16014 of ≤4.0, preferably in the range from 1.5 to 4.0, more preferably in the range from 2.0 to 4.0, and most preferably in the range from 2.5 to 4.0. Said MWD is achieved by polymerization using the specified metallocene catalyst, and not by visbreaking with peroxides or other radical generators.

It is preferred that the propylene homopolymer (HPP) is polymerized in the presence of a metallocene catalyst complex of formula (I)

4

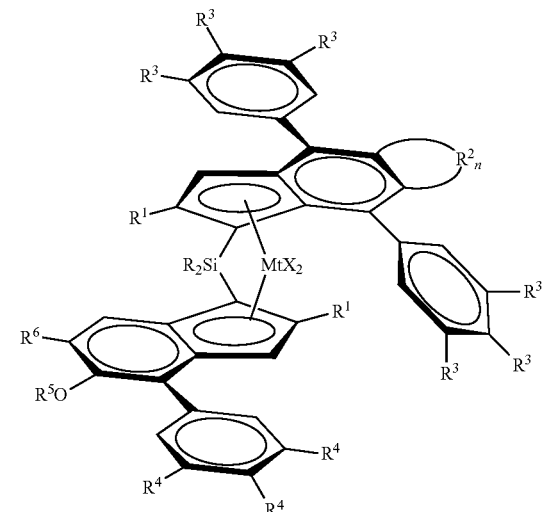

Formula (I)

wherein
Mt is Hf or Zr;
each X is a sigma-ligand,
each $R^1$ independently are the same or can be different and are a $CH_2$—$R^7$ group, with $R^7$ being H or linear or branched $C_{1-6}$-alkyl group, $C_{3-8}$ cycloalkyl group, $C_{6-10}$ aryl group,
each $R^2$ is independently a —CH=, —CY=, —$CH_2$—, —CHY— or —$CY_2$— group, wherein Y is a $C_{1-10}$ hydrocarbyl group and where n is 2-6,
each $R^3$ and $R^4$ are independently the same or can be different and are hydrogen, a linear or branched $C_1$-$C_6$-alkyl group, an OY group or a $C_{7-20}$ arylalkyl, $C_{7-20}$ alkylaryl group or $C_{6-20}$ aryl group, whereby at least one $R^3$ per phenyl group and at least one $R^4$ is not hydrogen, and optionally two adjacent $R^3$ or $R^4$ groups can be part of a ring including the phenyl carbons to which they are bonded,
$R^5$ is a linear or branched $C_1$-$C_6$-alkyl group, $C_{7-20}$ arylalkyl, $C_{7-20}$ alkylaryl group or $C_6$-$C_{20}$-aryl group,
$R^6$ is a $C(R^8)_3$ group, with $R^8$ being a linear or branched $C_1$-$C_6$ alkyl group,
each R is independently a $C_1$-$C_{20}$-hydrocarbyl, $C_6$-$C_{20}$-aryl, $C_{7-20}$-arylalkyl or $C_{7-20}$-alkylaryl.

The catalyst of the invention can be used in non-supported form or in solid form. The catalyst of the invention may be used as a homogeneous catalyst or heterogeneous catalyst.

The catalyst of the invention in solid form, preferably in solid particulate form, can be either supported on an external carrier material, like silica or alumina, or, in a particularly preferred embodiment, is free from an external carrier, however still being in solid form. For example, the solid catalyst is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

Details about the catalyst used in the present invention is described below.

Definitions

Throughout the description, the following definitions are employed.

By "free from an external carrier" is meant that the catalyst does not contain an external support, such as an inorganic support, for example, silica or alumina, or an organic polymeric support material.

The term "$C_{1-20}$ hydrocarbyl group" includes $C_{1-20}$ alkyl, $C_{2-20}$alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred $C_{1-20}$ hydrocarbyl groups are $C_{1-20}$ alkyl, $C_{4-20}$ cycloalkyl, $C_{5-20}$ cycloalkylalkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tert-butyl, isobutyl, $C_{5-6}$-cycloalkyl, cyclohexylmethyl, phenyl or benzyl.

The term "halo" includes fluoro, chloro, bromo and iodo groups, especially chloro or fluoro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites.

The nature of these σ-ligands can vary greatly.

The terms "C4 phenyl ring" and "C4' phenyl ring" relate to the substituted phenyl rings attached to the 4 and 4' positions of the indenyl and indacenyl rings, respectively. The numbering of these rings will be evident from the structures indicated herein.

Catalyst activity is defined in this application to be the amount of polymer produced/g catalyst/h. Catalyst metal activity is defined here to be the amount of polymer produced/g Metal/h. The term productivity is also sometimes used to indicate the catalyst activity although herein it designates the amount of polymer produced per unit weight of catalyst.

The term "molecular weight" is used herein to refer to weight average molecular weight Mw unless otherwise stated.

Detailed Description of Catalyst

The metallocene catalyst complexes of the invention are chiral, racemic bridged bisindenyl $C_1$-symmetric metallocenes in their anti-configuration. Although the complexes of the invention are formally $C_1$-symmetric, the complexes ideally retain a pseudo-$C_2$-symmetry since they maintain $C_2$-symmetry in close proximity of the metal center although not at the ligand periphery. By nature of their chemistry both anti and syn enantiomer pairs (in case of $C_1$-symmetric complexes) are formed during the synthesis of the complexes. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the scheme below.

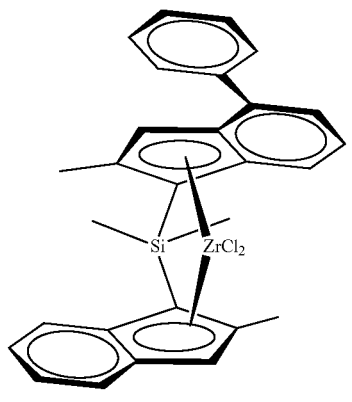

Racemic Anti

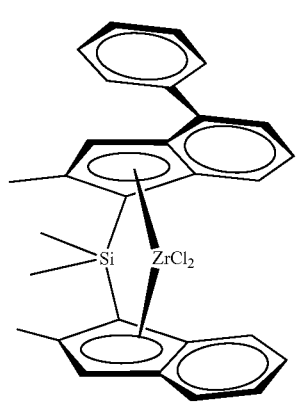

Racemic Syn

Formula (I), and any sub formulae, are intended to cover both syn- and anti-configurations. Preferred metallocene catalyst complexes are in the anti configuration.

The metallocene catalyst complexes of the invention are employed as the racemic-anti isomers. Ideally, therefore at least 95% mol, such as at least 98% mol, especially at least 99% mol of the metallocene catalyst complex is in the racemic-anti isomeric form.

In the metallocene catalyst complexes of the invention the following preferences apply. Metallocene catalyst complexes according to the invention are of formula (I):

7

Formula (I)

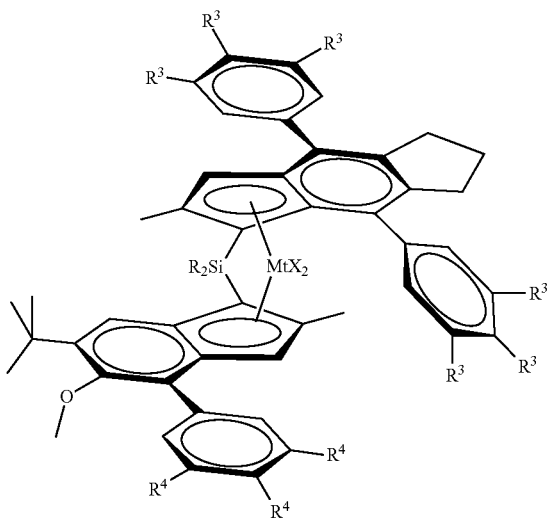

In a complex of formula (I) it is preferred if Mt is Zr or Hf, preferably Zr;

Each X is a sigma ligand. Most preferably, each X is independently a hydrogen atom, a halogen atom, $C_{1-6}$ alkoxy group or an R' group, where R' is a $C_{1-6}$ alkyl, phenyl or benzyl group. Most preferably, X is chlorine, benzyl or a methyl group. Preferably, both X groups are the same. The most preferred options are two chlorides, two methyl or two benzyl groups, especially two chlorides.

In the formula —$SiR_2$—, each R is independently a $C_{1-20}$-hydrocarbyl, $C_{6-20}$-aryl, $C_{7-20}$-arylalkyl or $C_{7-20}$-alkylaryl. The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups.

Preferably, both R groups are the same. It is preferred if R is a $C_1$-$C_{10}$-hydrocarbyl or $C_6$-$C_{10}$-aryl group, such as methyl, ethyl, propyl, isopropyl, tertbutyl, isobutyl, $C_{5-6}$-cycloalkyl, cyclohexylmethyl, phenyl or benzyl, more preferably both R are a $C_1$-$C_6$-alkyl, $C_{3-8}$ cycloalkyl or $C_6$-aryl group, such as a $C_1$-$C_4$-alkyl, $C_{5-6}$ cycloalkyl or $C_6$-aryl group and most preferably both R are methyl or one is methyl and another cyclohexyl. Most preferably the bridge is —$Si(CH_3)_2$—.

Each $R^1$ independently are the same or can be different and are a $CH_2$—$R^7$ group, with $R^7$ being H or linear or branched $C_{1-6}$-alkyl group, like methyl, ethyl, n-propyl, i-propyl, n-butyl, i-butyl, sec.-butyl and tert.-butyl or $C_{3-8}$ cycloalkyl group (e.g. cyclohexyl), $C_{6-10}$ aryl group (pref phenyl);

Preferably, both $R^1$ are the same and are a $CH_2$—$R^7$ group, with $R^7$ being H or linear or branched $C_1$-$C_4$-alkyl group, more preferably, both $R^1$ are the same and are a $CH_2$—$R^7$ group, with $R^7$ being H or linear or branched $C_1$-$C_3$-alkyl group. Most preferably, both $R^1$ are both methyl.

Each $R^2$ is independently a —$CH=$, —$CY=$, —$CH_2$—, —$CHY$— or —$CY_2$— group, wherein Y is a $C_{1-10}$ hydrocarbyl group, preferably a $C_{1-4}$ hydrocarbyl group and where n is 2-6, preferably 3-4.

Each substituent $R^3$ and $R^4$ are independently the same or can be different and are hydrogen, a linear or branched $C_1$-$C_6$-alkyl group, an OY group or a $C_{7-20}$ arylalkyl, $C_{7-20}$ alkylaryl group or $C_{6-20}$ aryl group, preferably hydrogen, a linear or branched $C_1$-$C_6$-alkyl group or $C_{6-20}$ aryl groups, and optionally two adjacent $R^3$ or $R^4$ groups can be part of a ring including the phenyl carbons to which they are bonded. More preferably, $R^3$ and $R^4$ are hydrogen or a linear or branched $C_1$-$C_4$ alkyl group or a OY-group, wherein Y is a is a $C_{1-4}$ hydrocarbyl group. Even more preferably, each $R^3$ and $R^4$ are independently hydrogen, methyl, ethyl, isopropyl, tert-butyl or methoxy, especially hydrogen, methyl or tert-butyl, whereby at least one $R^3$ per phenyl group and at least one $R^4$ is not hydrogen.

Thus, preferably one or two $R^3$ per phenyl group are not hydrogen, more preferably on both phenyl groups the $R^3$ are the same, like 3',5'-di-methyl or 4'-tert-butyl for both phenyl groups.

For the indenyl moiety preferably one or two $R^4$ on the phenyl group are not hydrogen, more preferably two $R^4$ are not hydrogen and most preferably these two $R^4$ are the same like 3',5'-di-methyl or 3',5'-di-tert-butyl.

$R^5$ is a linear or branched $C_1$-$C_6$-alkyl group such as methyl, ethyl, n-propyl, i-propyl, n-butyl, i-butyl, sec-butyl and tert-butyl, $C_{7-20}$ arylalkyl, $C_{7-20}$ alkylaryl group or $C_{6-20}$ aryl group.

$R^5$ is a preferably a linear or branched $C_1$-$C_6$ alkyl group or $C_{6-20}$ aryl group, more preferably a linear $C_1$-$C_4$ alkyl group, even more preferably a $C_1$-$C_2$ alkyl group and most preferably methyl.

$R^6$ is a $C(R^8)_3$ group, with $R^8$ being a linear or branched $C_1$-$C_6$ alkyl group.

Each R is independently a $C_1$-$C_{20}$-hydrocarbyl, $C_6$-$C_{20}$-aryl, $C_7$-$C_{20}$-arylalkyl or $C_7$-$C_{20}$-alkylaryl. Preferably each $R^8$ are the same or different with $R^8$ being a linear or branched $C_1$-$C_4$-alkyl group, more preferably with $R^8$ being the same and being a $C_1$-$C_2$-alkyl group. Most preferably, all $R^8$ groups are methyl.

In a preferred embodiment, the invention provides a metallocene catalyst complex of formula (Ia)

Formula (Ia)

wherein each $R^3$ and $R^4$ are independently the same or can be different and are hydrogen or a linear or branched $C_1$-$C_6$-alkyl group, whereby at least on $R^3$ per phenyl group and at least one $R^4$ is not hydrogen.

Specific metallocene catalyst complexes of the invention include:

rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride rac-anti-dimethylsilanediyl[2-methyl-4,8-bis-(3',5'-dimethylphenyl)-1,5,6,7-tetrahydro-s indacen-1-yl] [2-methyl-4-(3',5'-dimethylphenyl)-5-methoxy-6-tert-butylinden-1-yl] zirconium dichloride rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl] zirconium dichloride or their corresponding zirconium dimethyl analogues.

Throughout the disclosure above, where a narrower definition of a substituent is presented, that narrower definition is deemed disclosed in conjunction with all broader and narrower definitions of other substituents in the application. Synthesis The ligands required to form the catalysts of the invention can be synthesised by any process and the skilled organic chemist would be able to devise various synthetic protocols for the manufacture of the necessary ligand materials. WO2007/116034 discloses the necessary chemistry and is herein incorporated by reference. Synthetic protocols can also generally be found in WO2002/02576, WO2011/135004, WO2012/084961, WO2012/001052, WO2011/076780 and WO2015/158790. The examples section also provides the skilled person with sufficient direction. process for producing the ligand of the metallocene catalyst complex of formula (I or Ia) comprising the two $(R^3)_3$-phenyl-group substituents.

Synthesis of the Ligand of the Metallocene Catalyst Complex of Formula (I or Ia) Comprising the Two $(R^3)_3$-Phenyl-Group Substituents, Preferably Indacenyl Ligand Synthesis The ligand of the metallocenes as disclosed in PCT/EP2017/084273 include two different indenes, one methoxyindene and one indacene. The synthesis of the methoxyindene is simple and gives high yield, while the synthesis of the indacene requires several steps, as shown in scheme 1 for the case of the 4-(4-tert-butylphenyl)indacene:

Scheme 1

-continued

The ligand of the metallocene catalyst complex of formula (I or Ia) comprising the two $(R^3)_3$-phenyl-group substituents, preferably the indacene ligand used in the synthesis of the inventive metallocene catalyst complexes, which is the structural analogue of above structure, is obtained with one step less, as shown in scheme 2:

Scheme 2

11

-continued

12

Thus, the new metallocene catalyst complexes of the present invention can be prepared in a simpler way and as is shown in the experimental part in a more efficient way, too.

The present invention is therefore also related to a process for producing the ligand of the metallocene catalyst complex of formula (I or Ia) comprising the two $(R^3)_3$-phenyl-group substituents, preferably the indacene ligand.

This process analogous to scheme 2 comprises the steps
1. Electrophilic dibromination of the starting keton-compound, e.g. $R^1$-3,5,6,7-tetrahydro-s-indecen-1(2H)-one
2. Reduction of the corresponding dibromo-compound, e.g. 4,8-dibromo-$R^1$-3,5,6,7-tetrahydro-s-indecen-1(2H)-one, followed by methylation to yield the corresponding OMe-compound
3. Kumada coupling with $(R^3)_3$-phenylmagnesium bromide and
4. Demethoxylation Step 1 is preferably done with aluminium chloride in dichlormethane at low temperature, like 2 to 10° C., e.g. around +5° C.

The reduction in step 2 is preferably done by sodium borohydride in THF-MeOH medium at low temperature, like 2 to 10° C., e.g. around +5° C.

The methylation is preferably performed at room temperature with MeI/KOH/DMSO.

Step 3 is preferably done in the presence of $NiCl_2(PPh_3)$ IPr catalyst at reflux temperature and step 4 is preferably done with a catalytic amount of TsOH in toluene at reflux temperature.

Cocatalyst

To form an active catalytic species it is normally necessary to employ a cocatalyst as is well known in the art.

According to the present invention a cocatalyst system comprising a boron containing cocatalyst and/or an aluminoxane cocatalyst is used in combination with the above defined metallocene catalyst complex.

The aluminoxane cocatalyst can be one of formula (X):

$$\left[\begin{array}{c} R \\ | \\ Al-O \end{array}\right]_n \tag{X}$$

where n is usually from 6 to 20 and R has the meaning below.

Aluminoxanes are formed on partial hydrolysis of organo-aluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_{3-10}$ cycloalkyl, $C_7$-$C_{12}$ arylalkyl or alkylaryl and/or phenyl or naphthyl, and where Y can be hydrogen, halogen, preferably chlorine or bromine, or C1-C10 alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used instead of the aluminoxane cocatalyst or the aluminoxane cocatalyst can be used in combination with a boron containing cocatalyst.

It will be appreciated by the skilled man that where boron based cocatalysts are employed, it is normal to pre-alkylate the complex by reaction thereof with an aluminium alkyl compound, such as TIBA. This procedure is well known and any suitable aluminium alkyl, e.g. $Al(C_{1-6}$-alkyl$)_3$. can be used. Preferred aluminium alkyl compounds are triethylaluminium, tri-isobutylaluminium, tri-isohexylaluminium, tri-n-octylaluminium and tri-isooctylaluminium.

Alternatively, when a borate cocatalyst is used, the metallocene catalyst complex is in its alkylated version, that is for example a dimethyl or dibenzyl metallocene catalyst complex can be used.

Boron based cocatalysts of interest include those of formula (Z)

$$BY_3 \tag{Z}$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl) phenyl. Preferred options are trifluoroborane, triphenylborane, tris(4-fluorophenyl)borane, tris(3,5-difluorophenyl)borane, tris(4-fluoromethylphenyl)borane, tris(2,4, 6-trifluorophenyl)borane, tris(penta-fluorophenyl)borane, tris(tolyl)borane, tris(3,5-dimethyl-phenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate 3+ ion. Such ionic cocatalysts preferably contain a non-coordinating anion such as tetrakis (pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N, N-dimethylanilinium.

Preferred ionic compounds which can be used according to the present invention include: triethylammoniumtetra (phenyl)borate, tributylammoniumtetra(phenyl)borate, trimethylammoniumtetra(tolyl)borate, tributylammoniumtetra (tolyl)borate, tributylammoniumtetra(pentafluorophenyl) borate, tripropylammoniumtetra(dimethylphenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl) borate, N,N-dimethylaniliniumtetra(phenyl)borate, N,N-diethylaniliniumtetra(phenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakist(pentafluorophenyl)borate, triphenylphosphoniumtetrakis(phenyl)borate, triethylphosphoniumtetrakis (phenyl)borate, diphenylphosphoniumtetrakis(phenyl) borate, tri(methylphenyl)phosphoniumtetrakis(phenyl) borate, tri(dimethylphenyl)phosphoniumtetrakis(phenyl) borate, triphenylcarbeniumtetrakis(pentafluorophenyl) borate, or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

It has been surprisingly found that certain boron cocatalysts are especially preferred. Preferred borates of use in the invention therefore comprise the trityl ion. Thus the use of N,N-dimethylammonium-tetrakispentafluorophenylborate and $Ph_3CB(PhF_5)_4$ and analogues therefore are especially favoured.

According to the present invention, the preferred cocatalysts are alumoxanes, more preferably methylalumoxanes, combinations of alumoxanes with Al-alkyls, boron or borate cocatalysts, and combination of alumoxanes with boron-based cocatalysts.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

Catalyst Manufacture

The metallocene catalyst complex of the present invention can be used in combination with a suitable cocatalyst as a catalyst for the polymerization of propylene, e.g. in a solvent such as toluene or an aliphatic hydrocarbon, (i.e. for polymerization in solution), as it is well known in the art. Preferably, polymerization of propylene takes place in the condensed phase or in gas phase. The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/ 14856, WO95/12622 and WO2006/097497. The particle size is not critical but is preferably in the range 5 to 200 μm, more preferably 20 to 80 μm. The use of these supports is routine in the art.

In an alternative embodiment, no support is used at all. Such a catalyst can be prepared in solution, for example in an aromatic solvent like toluene, by contacting the metallocene (as a solid or as a solution) with the cocatalyst, for example methylaluminoxane or a borane or a borate salt previously dissolved in an aromatic solvent, or can be prepared by sequentially adding the dissolved catalyst components to the polymerization medium.

In one embodiment, no external carrier is used but the catalyst is still presented in solid particulate form. Thus, no external support material, such as inert organic or inorganic carrier, for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

Full disclosure of the necessary process can be found in WO03/051934, which is herein incorporated by reference.

The invention is also industrially advantageous, since it enables the preparation of the solid particles to be carried out as a one-pot procedure. Continuous or semicontinuous processes are also possible for producing the catalyst.

Catalyst Off-Line Prepolymerization

The use of the heterogeneous catalysts, where no external support material is used (also called "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is possible to "off line prepolymerize" the catalyst before using it in polymerization process.

It has to be noted that off line prepolymerization in this regard is part of the catalyst preparation process, being a step carried out after a solid catalyst is formed. The catalyst off line prepolymerization step is not part of the actual polymerization process configuration comprising a prepolymerization step. After the catalyst off line prepolymerization step, the solid catalyst can be used in polymerization.

Catalyst "off line prepolymerization" takes place following the solidification step of the liquid-liquid emulsion process. Pre-polymerization may take place by known methods described in the art, such as that described in WO 2010/052263, WO 2010/052260 or WO 2010/052264. Preferable embodiments of this aspect of the invention are described herein.

As monomers in the catalyst off-line prepolymerization step preferably alpha-olefins are used. Preferable C2-C10 olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene, especially propylene.

The catalyst off-line prepolymerization may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0 to 140° C., preferably 30 to 120° C., like 50 to 110° C.

Where the catalyst off line prepolymerization is done in fluorinated hydrocarbons, the temperature for the pre-polymerization step is below 70° C., e.g. in the range of –30 to 70° C., preferably 0-65° C. and more preferably in the range 20 to 55° C. Pressure within the reaction vessel is preferably higher than atmospheric pressure to minimize the eventual leaching of air and/or moisture into the catalyst vessel. Preferably the pressure is in the range of at least 1 to 15 bar, preferably 2 to 10 bar. The reaction vessel is preferably kept in an inert atmosphere, such as under nitrogen or argon or similar atmosphere.

Offline prepolymerization is continued until the desired pre-polymerization degree, defined as weight of polymer matrix/weight of solid catalyst before pre-polymerization step, is reached. The degree is below 25, preferably 0.5 to 10.0, more preferably 1.0 to 8.0, most preferably 2.0 to 6.0. Use of the off-line catalyst prepolymerization step offers the advantage of minimising leaching of catalyst components and thus local overheating.

After offline prepolymerization, the catalyst can be isolated and stored.

Polymerization

The propylene homopolymer (HPP) is preferably produced by a single- or multistage process polymerization of propylene such as bulk polymerization, gas phase polymerization, slurry polymerization, solution polymerization or combinations thereof. Preferably, the propylene homopolymer (HPP) can be made in a combination of loop and gas phase reactor. Those processes are well known to one skilled in the art.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, in the instant process for producing the $C_2C_3$ random copolymer composition as defined above the conditions for the first reactor (R-1), i.e. the slurry reactor (SR), like a loop reactor (LR), of step (a) may be as follows:

the temperature is within the range of 40° C. to 110° C., preferably between 60° C. and 100° C., more preferably between 65 and 95° C., the pressure is within the range of 20 bar to 80 bar, preferably between 40 bar to 70 bar, hydrogen can be added for controlling the molar mass in a manner known per se.

Subsequently, the reaction mixture of the first reactor (R-1) is transferred to the second reactor (R-2), i.e. gas phase reactor (GPR-1), where the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

Polypropylene Composition

The polypropylene composition according to the present invention comprises 0.1-0.4 wt %, preferably 0.1 to 0.35 wt %, more preferably 0.1 to 0.3 wt % of one or more slip agents, and 0.0-0.5 wt %, preferably 0.1 to 0.4 wt %, more preferably 0.1 to 0.3 wt % of one or more anti-blocking agents.

Slip agents are also commonly known in the art. Slip agents migrate to the surface and act as lubricants polymer to polymer and polymer against metal rollers, giving reduced coefficient of friction (CoF) as a result. Examples are fatty acid amids, like erucamide (CAS No. 112-84-30 5), oleamide (CAS No. 301-02-0), stearamide (CAS No. 124-26-5) or combinations thereof. A comprehensive listing of suitable slip agents can be found in Chapter 8 "Slip Additives" of the book "Plastic Additives Handbook" edited by H. Zweifel, R. D. Maier and M. Schiller, 6th edition, Hanser Publishers 2009, pages 629-636.

Common anti-blocking agents are natural silica such as diatomaceous earth (such as CAS No. 60676-86-0 (Super-fFloss™), CAS No. 60676-86-0 (SuperFloss E™), or CAS No. 60676-86-0 (Celite 499™)), synthetic silica (such as CAS No. 7631-86-9 or CAS No. 112926-00-8), silicates (such as aluminium silicate (Kaolin) CAS No. 1318-74-7, sodium aluminum silicate CAS No. 1344-00-9, calcined kaolin CAS No. 92704-41-1, aluminum silicate CAS No. 1327-36-2, or calcium silicate CAS No. 1344-95-2), synthetic zeolites (such as sodium calcium aluminosilicate hydrate CAS No. 1344-01-0). A comprehensive listing of suitable anti-blocking agents can be found in Chapter 7 "Anti-blocking Additives" of the book "Plastic Additives Handbook" edited by H. Zweifel, R. D. Maier and M. Schiller, $6^{th}$ edition, Hanser Publishers 2009, pages 613-628.

In a preferred embodiment, the polypropylene composition may further comprises one or more additives in a total amount of from 0.1 up to 5.0 wt %, based on the composition, selected from the group comprising UV stabilizers, antistatic agents, alphanucleating agents and antioxidants.

Such additives are commonly known to an art skilled person.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1, 1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g. SHT, CAS No. 11097-59-9), lactates and lactylates, as well as calcium stearate (CAS No. 1592-23-0) and zinc stearate (CAS No. 557-05-1).

Suitable UV-stabilisers are, for example, Bis-(2,2,6,6-tetramethyl-4-piperidyl)-sebacate (CAS No. 52829-07-9, Tinuvin 770); 2-hydroxy-4-n-octoxy-benzophenone (CAS No. 1843-05-6, Chimassorb 81).

Alpha nucleating agents like sodium benzoate (CAS No. 532-32-1); a mixture of aluminiumhydroxy-bis[2,2'-methylene-bis(4,6-di-t-butylphenyl)phosphate] and lithium myristate (commercially available as Adekastab NA-21 of Adeka Palmarole, France) or 1,3:2,4-bis(3,4-dimethylben-zylidene)sorbitol (CAS No. 135861-56-2, commercially available as Millad 3988 of Milliken, USA) can also be added.

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-1.000 ppm for each single component. Preferably at least an antioxidant is added.

The polypropylene composition according to the invention may be compounded and pelletized using any of the variety of compounding and blending machines and methods well known and commonly used in the resin compounding art. For blending the individual components of the instant polypropylene composition a conventional compounding or blending apparatus, e.g. a Banbury mixer, a 2-roll rubber mill, Buss-co-kneader or a twin screw extruder may be used. Preferably, a co-rotating twin screw extruder is used. The polypropylene compositions recovered from the extruder/mixer are usually in the form of pellets. These pellets are then further processed and formed into a film according to present invention.

Film

The above described polypropylene composition are suitable for the production of blown films as well as cast films.

Description of Film Production by Blown Film Technology

The above described composition is capable of being manufactured into water or air quench blown films, preferably air quenched blown films, on typical polyethylene blown film production equipment.

In principle the process comprising the steps of
(i) blowing up a tube of molten material with air perpendicularly to the upwards direction from a side-fed blown film die;
(ii) cooling it down with water contact cooling ring or air quench;
(iii) folding it and guiding it over deflector rolls onto the winder Blown Film Technology with Water Contact Cooling Ring In this technology for producing polymer films, the molten blend is extruded through a tubular die fed by a (usually single-screw) extruder and blown up to a tube. The film tube has contact on the exterior side to a water cooling ring and is cooled down quickly. The already solidified film tube is flattened afterwards by take-up rolls and taken off to a winder.

For a more detailed description see "Polypropylene Handbook", edited by Edward P. Moore, Jr., Hanser Publishers, 1996.

Blown Film Technology with Air Quench

In this manufacturing step for air quenched blown films the film is made using at least a 1.5 blow up ratio, preferably at least a 2.0 blow up ratio, more preferably at least a 2.5 blow up ratio.

The technique of air quenched blown film extrusion is well known for the production of thin plastic films. In an advantageous process, above described blends are extruded through a circular die to form a film. Air is introduced through the center of the die to maintain the film in the form of a bubble which increases the diameter of the film about 1.5 to 6 fold, after which the bubble is collapsed onto rolers. There are a number of variations of such a process within the skill in the art. Most references to blowing polyolefin films disclose processes used for polyethylene, but these are applicable to the above described blends within few modifications within the skill in the art without undue experimentation.

For instance cooling is often advantageously modified because the art recognizes that polypropylene cools and crystallizes at a rate different from that of polyethylene.

Therefore, adjustments to the cooling parameters often produce a more stable bubble at desired output rates.

In the formation of blown films, the melted blend (melt) enters a ring-shaped die either through the bottom or side thereof. The melt is forced through spiral grooves around the surface of a mandrel inside the die and extruded through the die opening as a thick-walled tube. The tube is expanded into a bubble of desired diameter and correspondingly decreased thickness as previously described.

Description of Film Production by Cast Film Technology

In this most simple technology for producing polymer films, the molten blend is extruded through a slot die fed by a (normally single-screw) extruder onto a first cooled roll, the so-called chill-roll. From this roll, the already solidified film is taken up by a second roll (nip roll or take-up roll) and transported to a winding device after trimming the edges. Only a very limited amount of orientation is created in the film, which is determined by the ratio between die thickness and film thickness or the extrusion speed and the take-up speed, respectively. Due to its technical simplicity, cast film technology is a very economical and easy-to-handle process. The films resulting from this technology are characterised by good transparency and rather isotropic mechanical properties (limited stiffness, high toughness).

Summing up the process comprises the steps of i) pouring or spreading a solution, hot-melt or dispersion of a material onto a temporary carrier ii) hardening the material, and iii) stripping the hardened film from the surface of the carrier.

Mono-layer films having a thickness of 5 to 300 μm, preferably 10 to 200 μm, more preferably 20 to 150 μm are suitable according to the present invention.

Films according to the present invention may be non-oriented, mono-axially or bi-axially oriented.

It is preferred, that the films are non-oriented.

Especially preferred are however cast-films, especially preferred are non-oriented cast films.

In an especially preferred embodiment, the polypropylene composition has a coefficient of friction (CoF) determined according to ISO 8295 fulfilling the equation (I)

$$CoF < 0,658 \text{ days}^{-0.139} \qquad (I)$$

when cast into a film with a thickness of 50 micrometers.

In a further embodiment, the polypropylene composition has a haze of not more than 2.5%, preferably not more than 2.3%, more preferably not more than 2.1%, determined according to ASTM D 1003, when cast into a film with a thickness of 50 micrometers.

In the following the present invention is further illustrated by means of examples.

EXAMPLES

1. Measuring Methods

The following definitions of terms and determination methods apply for the above general description of the invention as well as to the below examples unless otherwise defined. $MFR_2$ (230° C.) is measured according to ISO 1133 (230° C., 2.16 kg load).

Quantification of Microstructure by NMR Spectroscopy

Quantitative nuclear-magnetic resonance (NMR) spectroscopy was used to quantify the comonomer content of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probe-head at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%] = 100 * fE$$

The weight percent comonomer incorporation was calculated from the mole fraction:

$$E[\text{wt }\%] = 100 * (fE*28.06)/((fE*28.06) + ((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The xylene solubles (XCS, wt.-%): Content of xylene cold solubles (XCS) is determined at 25° C. according ISO 16152; first edition; 2005-07-01

Number average molecular weight ($M_n$), weight average molecular weight ($M_w$) and polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1: 2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative cali-bration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

DSC analysis, melting temperature ($T_m$) and heat of fusion ($H_f$), crystallization temperature ($T_c$) and heat of crystallization ($H_c$): measured with a TA Instrument Q2000 differential scanning calorimetry (DSC) on 5 to 7 mg samples. DSC is run according to ISO 11357/part 3/method $C_2$ in a heat/cool/heat cycle with a scan rate of 10° C./min in the temperature range of −30 to +225° C. Crystallization temperature and heat of crystallization (He) are determined from the cooling step, while melting temperature and heat of fusion ($H_f$) are determined from the second heating step.

The glass transition temperature Tg is determined by dynamic mechanical analysis according to ISO 6721-7. The measurements are done in torsion mode on compression moulded samples (40×10×1 $mm^3$) between −100° C. and +150° C. with a heating rate of 2° C./min and a frequency of 1 Hz.

Transparency, Haze, Clarity

Transparency, haze and clarity were determined on cast films with a thickness of 50 μm according to ASTM D 1003.

The retortability performance in terms of transparency, haze and clarity was determined according to ASTM D 1003 by measuring those optical parameters after steam steriliza-tion at 121° C. for 30 min on cast films with a thickness of 50 μm for propylene homopolymers.

Coefficient of Friction (CoF)

The dynamic Coefficient of Friction (CoF) as a measure of the frictional behaviour of the film was determined according to ISO 8295 on film samples with a thickness of 50 μm. Immediately after film production the film has been stored at 23° C. and relative humidity of 50% for different times: 1 day, 3 days, 7 days and 21 days. Measurement of CoF was then performed at 23° C. on the inside of the film roll (inside/inside—friction).

2. Examples

The catalyst used in the polymerization process for the polypropylene homopolymer (HPP) of the inventive examples (IE1, 2, 3) was produced as follows:

Preparation of MAO-Silica Support

A steel reactor equipped with a mechanical stirrer and a filter net was flushed with nitrogen and the reactor tempera-ture was set to 20° C. Next silica grade DM-L-303 from AGC Si-Tech Co, pre-calcined at 600° C. (5.0 kg) was added from a feeding drum followed by careful pressuring and depressurising with nitrogen using manual valves. Then toluene (22 kg) was added. The mixture was stirred for 15 min. Next 30 wt % solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated SiO2 was dried at 60° under nitrogen flow for 2 hours and then for 5 hours under vacuum (−0.5 barg) with stirring. MAO treated sup-port was collected as a free-flowing white powder found to contain 12.2% Al by weight.

Catalyst Synthesis

The metallocene complex $C_2$ has been produced as described in WO2019/179959 for MC-2

30 wt % MAO in toluene (0.7 kg) was added into a steel nitrogen blanked reactor via a burette at 20° C. Toluene (5.4 kg) was then added under stirring. Metallocene C2 (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room tem-perature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9% Al and 0.11% Zr.

Polymerization

The polymerization conditions of HPP used as inventive examples in IE1 to IE3 are indicated in Table 1. The polymerization were carried on a Borstar pilot plant, with prepolymerizer, loop and first gas phase reactor connected sequentially, in the presence of the catalyst described above. The result polymer powder was compounded with 0.1 wt % of Irganox B215, 0.05 wt % of calcium stearate on the TSE 16 twin screw extruder, with throughput of 7 kg/h and melt temperature of 210° C. The properties measured on this products (indicate as Final) are shown in Table 1, too.

The HPP in CE1 is a commercialized polypropylene homopolymer HD234CF from *Borealis* AG produced in the presence of Zigler-Natta catalyst having a melting tempera-ture of 164° C. and an MFR2 (230° C.) of 8.0 g/10 min.

TABLE 1

| Preparation of the Examples | | |
|---|---|---|
| | | HPP |
| B1 Prepoly reactor | | |
| Temperature | [° C.] | 25 |
| Pressure | [kPa] | 5140 |

TABLE 1-continued

| Preparation of the Examples | | |
|---|---|---|
| | | HPP |
| B2 loop reactor | | |
| Temperature | [° C.] | 75 |
| Pressure | [kPa] | 5147 |
| $MFR_2$ | [g/10 min] | 7.5 |
| XCS | [wt.-%] | 1.3 |
| Feed $H_2$/C3 ratio | [mol/kmol] | 0.11 |
| Amount | [wt.-%] | 62 |
| B3 GPR | | |
| Temperature | [° C.] | 80 |
| Pressure | [kPa] | 2400 |
| $MFR_2$ | [g/10 min] | 8.7 |
| $H_2$/C3 ratio | [mol/kmol] | 1.7 |
| Amount | [wt.-%] | 38 |
| Final | | |
| $MFR_2$ | [g/10 min] | 9.6 |
| XCS | [wt.-%] | 1.2 |
| Tm | [° C.] | 156 |
| Tc | [° C.] | 114 |
| Mw | [kg/mol] | 235 |
| Mw/Mn | [-] | 2.6 |
| 2.1 | [mol %] | 0.69 |
| Tg below −20° C. | [° C.] | n.d. |
| Tg above −20° C. | [° C.] | 0 |

The IEs are produced with the HPP base powder sample as indicated in Table 1 and difference amount of slip agent and antiblock agent are added in the compounding step. The recipe are shown in Table 2. The compounding was done on a ZSK 32 twin screw extruder, with a throughput of 200 kg/h and melt temperature of 210° C.

Cast films were produced on a single screw extruder with a barrel diameter of 30 mm and a slot die of 200×0.5 mm in combination with a chill- and take-up roll. Melt temperature was 260° C. in the die. The chill roll and the take-up roll were kept at 15° C. Film thickness was 50 μm and it is adjusted by varying the ratio between the extruder output and the take-off speed.

Additives:

Calcium Stearate is Ceasit FI (CAS No. 216-472-8), produced by Baerlocher.

Erucic acid amide is Finawax-E (CAS No. 112-84-5), commercially available from Fine Organics.

Synthetic silica is Slobloc 45B (CAS No. 7631-86-9), commercially available from Grace.

The results are shown in Table 2 for the films made of polypropylene homopolymers (IE1-3 and CE1)

TABLE 2

| Properties of films made of propylene homopolymers | | | | | |
|---|---|---|---|---|---|
| | | IE1 | IE2 | IE3 | CE1 |
| HPP | wt % | 99.65 | 99.6 | 99.55 | |
| Irganox B215 | wt % | 0.1 | 0.1 | 0.1 | |
| Calcium Stearate | wt % | 0.05 | 0.05 | 0.05 | |
| erucic acid amide | wt % | 0.2 | 0.25 | 0.3 | |
| synthetic silica | wt % | 0.18 | 0.18 | 0.18 | |
| MFR | g/10 min | 9.3 | 9.3 | 10.1 | 8.0 |
| XCS | wt % | 1.17 | 1.17 | 1.17 | 2.04 |
| Tc | ° C. | 114 | 115 | 114 | 119 |
| Tm | ° C. | 156 | 155 | 156 | 166 |
| Hm | J/g | 102 | 102 | 101 | 104 |

TABLE 2-continued

| Properties of films made of propylene homopolymers | | | | | |
|---|---|---|---|---|---|
| | | IE1 | IE2 | IE3 | CE1 |
| Film 50 um | | | | | |
| Haze/b.s. | % | 1.85 | 1.99 | 2.12 | 3.82 |
| clarity/b.s. | % | 98.1 | 98.3 | 98.2 | 96.6 |
| CoF after | | | | | |
| 1 day | | 0.6 | 0.56 | 0.51 | 0.66 |
| 3 days | | 0.45 | 0.42 | 0.34 | 0.53 |
| 7 days | | 0.36 | 0.32 | 0.28 | 0.46 |
| 14 days | | 0.28 | 0.27 | 0.25 | 0.4 |
| 28 days | | 0.25 | 0.22 | 0.2 | 0.35 |

It is clearly shown in the table 2 that cast films of the present invention have a lower CoF already 3 days after film production, and even lower value 7 days after the film production, compared to the comparative examples. At the same time, optical properties, such as haze and clarity of the films, are clearly improved.

The invention claimed is:

1. A process for preparing a film, comprising the steps of:
   i) preparing a propylene homopolymer (HPP) having a melting temperature (Tm) measured by differential scanning calorimetry (DSC) according to ISO 11357 in a range from 152 to 162° C., a xylene cold soluble fraction (XCS) determined at 25° C. according to ISO 16152 of equal or below 1.5 wt % and a content of 2,1 erythro regiodefects as determined from $^{13}$C-NMR spectroscopy in a range from 0.01 to 1.00 mol % in a multistage process wherein a loop reactor is followed by a gas phase reactor, in the presence of a catalyst system comprising a cocatalyst comprising a compound of a group 13 metal, and a metallocene catalyst complex of formula (I):

Formula (I)

wherein
Mt is Hf or Zr;
each X is a sigma-ligand,
each $R^1$ independently is the same or may be different and is a $CH_2$—$R^7$ group, where $R^7$ is H or linear or branched $C_{1-6}$-alkyl group, $C_{3-8}$ cycloalkyl group, $C_{6-10}$ aryl group, each $R^2$ is independently a —CH=, —CY=, —CH2-, —CHY— or —CY2-group, wherein Y is a $C_{1\text{-}10}$ hydrocarbyl group and where n is 2-6, each $R^3$ and $R^4$ is independently the same or may be different and is hydrogen, a linear or branched $C_1$-$C_6$-alkyl group, an OY group or a $C_{7\text{-}20}$ arylalkyl, $C_{7\text{-}20}$ alkylaryl group or $C_{6\text{-}20}$ aryl group, whereby at least one $R^3$ per phenyl group and at least one $R^4$ is not hydrogen, and optionally two adjacent $R^3$ or $R^4$ groups may be part of a ring including the phenyl carbons to which they are bonded, $R^5$ is a linear or branched $C_1$-$C_6$-alkyl group, $C_{7\text{-}20}$ arylalkyl, $C_{7\text{-}20}$ alkylaryl group or $C_6$-$C_{20}$-aryl group, $R^6$ is a C $(R^8)_3$ group, where $R^8$ is a linear or branched $C_1$-$C_6$ alkyl group, each R is independently a $C_1$-$C_{20}$-hydrocarbyl, $C_6$-$C_{20}$-aryl, $C_7$-$C_{20}$-arylalkyl or $C_7$-$C_{20}$-alkylaryl, ii) forming the propylene homopolymer (HPP) obtained in step i into a film together with 0.1-0.4 wt % of a slip agent, and 0.0-0.5 wt % of an anti-block agent.

2. The process according to claim 1, wherein the film is a non-oriented cast or blown film.

3. The process according to claim 1, wherein the propylene homopolymer (HPP) has a melt flow rate MFR2 (230° C., 2.16 kg) determined according to ISO 1133 in a range of 4.0-20.0 g/10 min.

4. The process according to claim 1, wherein the propylene homopolymer (HPP) has a molecular weight distribution (MWD) of equal or below 4.0.

5. The process according to claim 1, wherein the propylene homopolymer (HPP) has 2,1-erythro regiodefects in a range from 0.20 to 0.80 mol %, determined by $^{13}$C-NMR spectroscopy.

6. The process according to claim 1, wherein the propylene homopolymer (HPP) has an isotactic triad fraction (mm) determined from $^{13}$C-NMR spectroscopy of at least 97.5%.

7. The process according to claim 1, wherein a polypropylene composition comprising the propylene homopolymer (HPP), the slip agent, and the anti-block agent has a coefficient of friction (CoF) determined according to ISO 829 fulfilling the equation (I):

$$\text{CoF} < 0.658 \text{ days}^{-0.189} \tag{I}$$

when cast into a film with a thickness of 50 micrometers.

8. The process according to claim 1, wherein a polypropylene composition comprising the propylene homopolymer (HPP), the slip agent, and the anti-block agent has a haze of not more than 2.5%, determined according to ASTM D 1003, when cast into a film with a thickness of 50 micrometers.

9. The process according to claim 1, wherein the propylene homopolymer (HPP) is prepared in the presence of a metallocene catalyst complex, wherein:

Mt is Zr, each X is independently a hydrogen atom, a halogen atom, $C_{1\text{-}6}$ alkoxy group or an R' group, where R' is a $C_{1\text{-}6}$ alkyl, phenyl or benzyl group, each R is independently a $C_1$-$C_{20}$-hydrocarbyl, $C_6$-$C_{20}$-aryl, $C_7$-$C_{20}$-arylalkyl or $C_7$-$C_{20}$-alkylaryl, each $R^1$ independently is the same or may be different and is a $CH_2$—$R^7$ group, where $R^7$ is H or linear or branched $C_{1\text{-}6}$-alkyl group, $C_{6\text{-}10}$ aryl group, each $R^2$ is independently a —CH=, —CY=, —CH$_2$-, —CHY-or-CY2-group, wherein Y is a $C_{1\text{-}4}$ hydrocarbyl group and where n is 3-4, each $R^3$ and $R^4$ is independently the same or may be different and is hydrogen, a linear or branched $C_1$-$C_6$-alkyl group or a $C_{6\text{-}20}$ aryl group, whereby at least one $R^3$ per phenyl group and at least one $R^4$ is not hydrogen, $R^5$ is a linear or branched $C_1$-$C_6$ alkyl group or $C_{6\text{-}20}$ aryl group and $R^6$ is a C $(R^8)_3$ group, where $R^8$ is a linear or branched $C_1$-$C_4$ alkyl group.

10. The process according to claim 1, wherein the propylene homopolymer (HPP) is prepared in the presence of a metallocene catalyst complex, wherein:

Mt is Zr, each X is independently a chlorine, benzyl or a methyl group, each R is independently a $C_1$-$C_{10}$-hydrocarbyl or $C_6$-$C_{10}$-aryl group, both $R^1$ are the same and are a $CH_2$—$R^7$ group, where $R^7$ is H or linear or branched $C_1$-$C_6$-alkyl group, each $R^2$ is independently a —CH=, —CY=, —CH$_2$—, —CHY— or —CY$_2$— group, wherein Y is a $C_{1\text{-}4}$ hydrocarbyl group and where n is 3-4, each $R^3$ and $R^4$ is independently the same or may be different and is hydrogen, a linear or branched $C_1$-$C_6$-alkyl group or $C_{6\text{-}20}$ aryl groups, whereby at least one $R^3$ per phenyl group and at least one $R^4$ is not hydrogen, $R^5$ is a linear or branched $C_1$-$C_6$ alkyl group or $C_{6\text{-}20}$ aryl group and $R^6$ is a C $(R^8)_3$ group, $R^8$ is the same and is a $C_1$-$C_2$-alkyl group.

11. The process according to claim 1, wherein the catalyst system comprises as cocatalyst alumoxane, combinations of alumoxane with Al-alkyls, boron or borate cocatalysts, or combination of alumoxanes with boron-based cocatalysts.

* * * * *